(12) United States Patent
Harvey et al.

(10) Patent No.: US 7,824,268 B2
(45) Date of Patent: Nov. 2, 2010

(54) LIVE HOSTED ONLINE MULTIPLAYER GAME

(75) Inventors: Roy Harvey, Maitland, FL (US); Greg Schaefer, Stillwater, MN (US)

(73) Assignee: Electronic Arts, Inc., Redwood City, CA (US)

( * ) Notice: Subject to any disclaimer, the term of this patent is extended or adjusted under 35 U.S.C. 154(b) by 265 days.

(21) Appl. No.: 11/613,060

(22) Filed: Dec. 19, 2006

(65) Prior Publication Data
US 2008/0146342 A1   Jun. 19, 2008

(51) Int. Cl.
*A63F 9/24* (2006.01)
(52) U.S. Cl. .................................... 463/42; 463/9
(58) Field of Classification Search .............. 463/9, 463/42

See application file for complete search history.

(56) References Cited

U.S. PATENT DOCUMENTS

| | | |
|---|---|---|
| 6,709,330 B1 * | 3/2004 | Klein et al. ............. 463/9 |
| 2002/0042293 A1 * | 4/2002 | Ubale et al. ............. 463/9 |

* cited by examiner

*Primary Examiner*—Pierre E Elisca
(74) *Attorney, Agent, or Firm*—Philip H. Albert; Townsend and Townsend and Crew, LLP

(57) ABSTRACT

A live-hosted multiplayer online gaming system includes a plurality of game clients, a game controller, and a live-operator input. The game controller includes logic to operate a live-hosted multiplayer online game, logic to couple the game controller to the plurality of game clients via a network, and logic to receive inputs from and to send outputs to the plurality of game clients. The live operator console further includes logic to couple the live operator input to the game server to enable communication between the live operator input and the game controller, logic to synchronize the live operator input to the current game state, and logic to send messages to the game controller that cause the game controller to create events that control at least in part the execution of the live hosted multiplayer online game.

45 Claims, 7 Drawing Sheets

Fig. 4 Live Host Console Registration with Game Controller

Fig. 5  Inserting Event into Game Server Event Queue

LIVE HOSTED ONLINE MULTIPLAYER GAME

BACKGROUND OF THE INVENTION

The present invention relates generally to video games and in particular to multiplayer online video games that allow multiple persons to play a game via a network.

The advent of the Internet has not only revolutionized global communications, but it has also revolutionized the way that people play video games. Video games have evolved to take advantage of the nearly instantaneous global communications provided by the Internet in order to provide rich multiplayer online gaming experiences where players from all over the world compete and/or interact with one another. Players experience a synchronized game environment where they can play the same game at the same time regardless of their individual geographic locations. Some online multi-player games can support from hundreds to thousands of concurrent users playing the same game at the same time.

The global internetwork of networks referred to as the Internet is used here as an example of a network that connects multiple player client systems. Other networks might be used, or variations of the Internet (an extranet, intranet, WAN, metro-network, etc.) might be used, so it should be understood that unless otherwise indicated, the descriptions here are not limited to networking over the Internet.

A typical setup involves one or more game servers coupled to multiple player client systems over a network. Players may interact as part of an online multiplayer game using their clients that might be implemented using one or more of a number of client-side platforms, such as a personal computer (PC) or a video game console such as the Microsoft XBox 360, the Sony PlayStation 3 (PS3) and the Nintendo Wii. The game server(s) for multiplayer online games generally register the actions of each individual player as indications of those actions are received from the player system and then update the shared gaming environment representing the game play accordingly and convey such information to the player systems. The network allows game players to be widely distributed over a large geographic area and remote from the game servers.

Typically, the player client has software (or uses software not specific to the game) and the game servers have software and collectively the programs running in those locations have state. The state of the various programs may define what is happening in the game environment and what can happen next. For example, the game environment might be a race track and the state of the game might be represented by data stored at a game server and that state might dictate that one red car is ahead of one blue car, etc. The player client software (game-specific or otherwise) should then have instructions on how to interpret that state and provide appropriate displays, processing, etc. for the player consistent with that state.

A number of different game genres have been adapted to the online multiplayer game format including role playing games, simulations and action games. Role playing games are generally based in a persistent virtual fantasy world and players assume the role of a character that takes part in a number of quests or challenges either in conjunction with or in competition with other players. Simulation type games provide a persistent virtual world in which characters interact with one another and with the virtual game world. Simulation-type games may also provide players with a number of tasks to be completed.

With the increasing demands of customers for ever richer gaming experiences, advances in online video games are needed.

BRIEF SUMMARY OF THE INVENTION

A video game system according to embodiments of the present invention provide for live-hosted multiplayer online video games that allow multiple players to play a game at the same time over a network while interacting with a live host that interacts to alter game state and flow via a live host console system coupled directly or indirectly to player systems and one or more game servers.

In one embodiment of the present invention, a live-hosted multiplayer online gaming system includes a plurality of game clients, a game controller, and a live-operator input. The game controller includes logic to operate a live-hosted multiplayer online game, logic to couple the game controller to the plurality of game clients via a network, and logic to receive inputs from and to send outputs to the plurality of game clients. The live operator console further includes logic to couple the live operator input to the game server to enable communication between the live operator input and the game controller, logic to synchronize the live operator input to the current game state, and logic to send messages to the game controller that cause the game controller to create events that control at least in part the execution of the live hosted multi-player online game.

In another embodiment, a method for operating a live hosted multiplayer online game is provided. The method includes the steps of registering a plurality of video game clients to participate in the live hosted multiplayer online game; registering a live host console to provide a user interface for a live host to control and monitor the live hosted multiplayer online game; publishing a question to the plurality of video game clients; receiving a set of responses from the plurality of responses received from the plurality of video game clients; creating a summary of the set of responses received from the plurality of video game clients; sending the summary of the set of responses to the live host console; receiving an event request from the live host console; and transmitting a game content to the plurality of client video game clients in response to the event request.

Other features and advantages of the invention will be apparent in view of the following detailed description and preferred embodiments.

Figure 1:
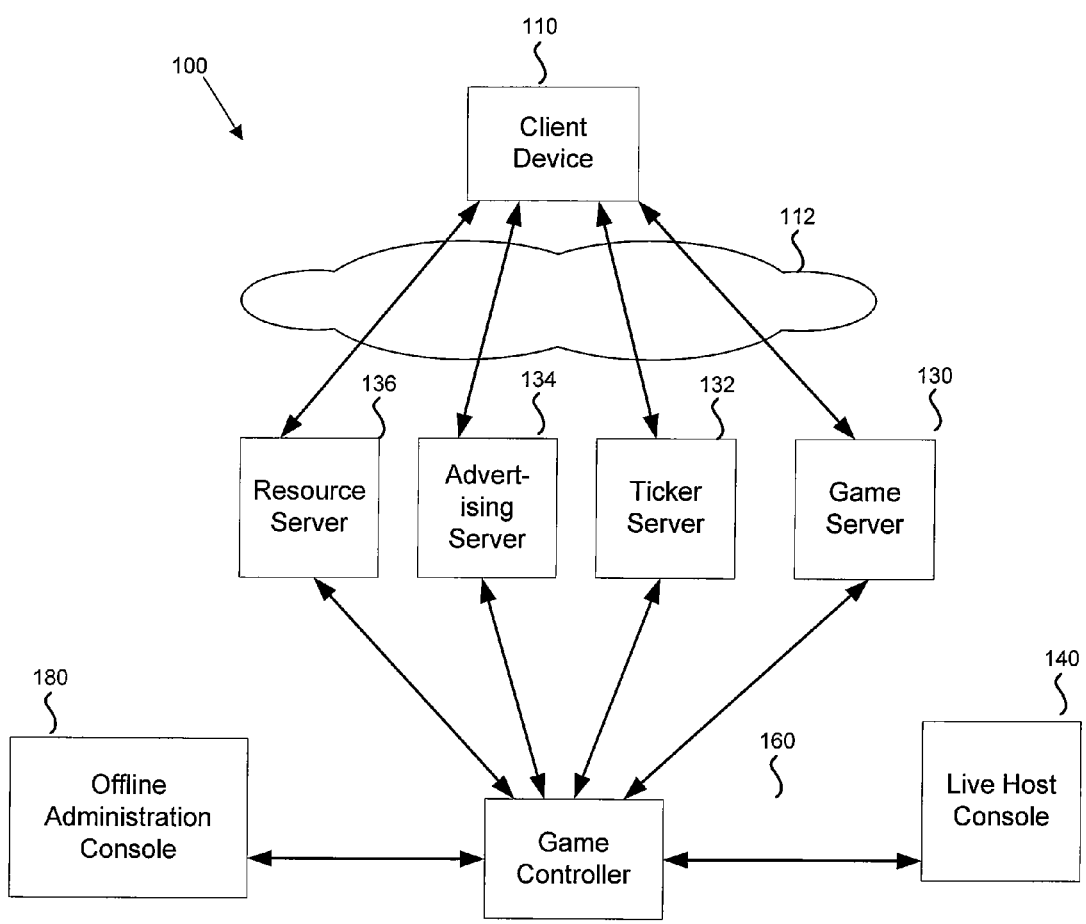
FIG. 1 depicts a block diagram of an exemplary live hosted online multiplayer game system according to one embodiment of the present invention.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

One skilled in the art will recognize that the teachings of the figures and this disclosure as depicted as examples of implementations of the present invention, and that many other implementations are possible without departing from the essential characteristics of the present invention.

A disadvantage of prior online multiplayer games is that the players are limited to interacting with other players and/or computer-controlled characters that are part of the game environment. Computer-controlled characters are often programmed with build-in artificial intelligence that allows the characters to respond and interact with human-controlled characters. However, computer-controlled characters are limited by their programming, sometimes leading to less compelling and engaging game play.

With the addition of a live host console, a live host can interact with the players and affect the game play, such as to help maintain the continuity and flow of the game. The host can ask questions of the contestants that the contestants must answer in order to earn points or win prizes. The host can play a crucial role in the game by helping maintain the excitement and anticipation experienced by the game players. Unlike a live host that is present in most televised game shows, the computer-controlled hosts found in online games only have a limited ability to respond to events that occur during the course of a game.

FIG. 1 depicts an exemplary live hosted online multiplayer game system 100 ("game system") according to one embodiment of the present invention. Game system 100 is a client-server architecture comprising client device 110, network 112, game server 130, ticker server 132, advertising server 134, resource server 136, live host console 140, game controller 160, and offline administration console 180.

Client device 110 is a network-enabled consumer electronic device configured to execute a set of software applications that enable a user to play a video game. In specific embodiments, client device 110 is a consumer electronic device with a video display output such as a personal computer (such as a desktop, laptop, or handheld computer), a personal digital assistant (PDA), mobile phone or a video game console (such as the Microsoft XBox 360, Nintendo Wii, or Sony PlayStation 3). In some embodiments, client device 110 has at least a portion of software required to execute the game stored on removable media 320 such as a CD-ROM, DVD-ROM or magnetic disk. In other embodiments, software required to execute the game is stored in a persistent memory installed in client device 110, such as a magnetic or optical disk drive, a read-only memory (ROM) or a flash memory. In yet other embodiments, at least a portion of the software required to execute the game is accessed by client device 110 from game server 130 and is downloaded to client device 110.

Client device 110 is connected to network 112, enabling two-way communications with game server 130, ticker server 132, advertising server 134, and resource server 136. An exemplary client device is further described in FIG. 3. Network communications are well known in the art of communications, and a person having ordinary skill in the art would appreciate that network 112 provides communication means for sending and receiving signals. The communications means may include wireless communication means (such as through radio signals or other electromagnetic radiation, or other means of communication no requiring a physical connection between a transmitter and receiver) and/or physical or wired communication means utilizing physical links between a transmitter and receiver such as copper wire, fiber optic cable). In a preferred embodiment, network 112 is the Internet, the globally-interconnected system of networks that connects computers around the world, and resource server 136, advertising server 134, ticker server 132, and game server 130 communicate with client device 110 via the Internet.

Game controller 160 is a network-connected server or servers that control operation of a live-hosted multiplayer online game, including controlling interactions among the various components of game system 100. In some embodiments, game controller 160 hosts more than one live-hosted multiplayer online game simultaneously, allowing game system 100 to be used to support multiple online multiplayer games.

Figure 5:
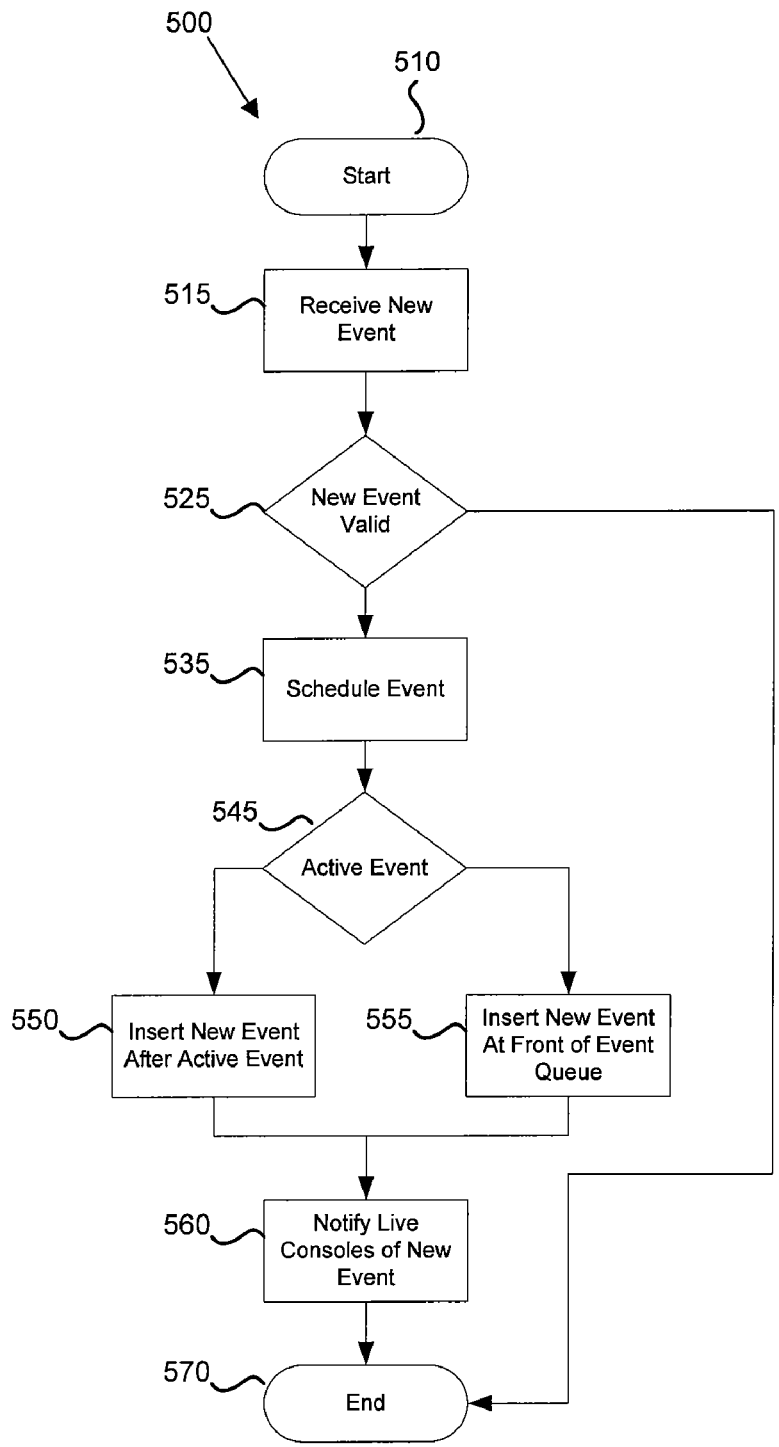
FIG. 5 depicts a flow diagram of a process for inserting an event into a game show event queue.

Game controller 160 maintains an event queue for each game that game controller 160 hosts. The event queue maintains the integrity of the state of an active online multiplayer game by ensuring that game events that affect the state of the game occur sequentially and do not conflict with one another. FIG. 5 provides a detailed description of a process 500 for inserting events into the event queue. Game controller 160 also maintains an in-memory database containing data reflecting the current state of a live hosted online multiplayer game such as the current number of game clients registered for a particular game, the number of right answers that were provided for a particular question, and the average number of tokens wagered for a particular game. Game controller 160 provides querying and reporting facilities that enable other components of the system, such as live host console 140 to submit queries to be run against the in-memory database.

Game server 130 is a network-connected server that transmits game content to a plurality of client devices 110. Game content may include graphics, executable program code, game data, and other information related to a particular game being hosted on the game server. Game server 130 has bi-directional communications with game controller 160. Game server 130 instructs game server 130 to provide content to the plurality of client devices 110 connected to game system 100. In some embodiments, game server 130 is configured to provide content for one or more games. In yet other embodiments, game system 100 comprises a plurality of game servers 130 that provide content to a plurality of client devices 110.

Ticker server 132 is a network-connected server that broadcasts ticker messages to a plurality of client devices 110. The ticker messages are sent to the plurality of client device 110 via network 112 in response to a ticker message transmitted by game server 160 to ticker server 132. The plurality of client devices 110 receive the ticker messages via network 112 and display the messages on a ticker portion of a user interface of the plurality of client devices 110. In some embodiments, the ticker portion of the user interface of the plurality of client devices 110 displays the ticker message in a scrolling action, generally from right to left. In some embodiments, a user may configure client device 110 to not display ticker messages, to temporarily halt the ticker, to change the speed of that the ticker scrolls the messages and/or to save the ticker messages for later review. The content of the ticker messages comprises textual content related to a game in which the user is currently participating, such as information regarding the number of players participating in the game, a set of high scores for the game and the usernames of the players that have achieved the high scores, and the number of questions remaining in the session. In some embodiments, ticker server 132 communicates with game controller 160 via network 112. In some embodiments, ticker server 132 communicates with game controller 160 via an intermediary network that is independent from network 112 and provides for communication among the components of game system 100. In yet other embodiments, ticker server 160 may be incorporated into game controller 160.

Advertising server 134 is a network-connected server that transmits advertising data to the plurality of client devices 110 registered with game system 100. Advertising server 134 is configurable to broadcast an advertisement to all or a portion of the plurality of client devices 110. In an embodiment, advertising server 134 is configurable to send targeted advertising content to a particular subset of the plurality of client devices 110. For example, the subset of the plurality of client devices to which to send the targeted advertising content may be determined based upon a number of parameters, such as user demographic information such as geographic location or user gaming history. In an embodiment, advertising server 134 may also receive messages from the plurality of client devices 110 based upon events that occur at the plurality of client devices 110, such as a user clicking upon a particular advertisement or a user makes a change to his or her user profile indicating a change to his or her advertising preferences.

In some embodiments, advertising server 134 communicates with game controller 160 via network 112. In some embodiments, advertising server 134 communicates with game controller 160 via an intermediary network that is independent from network 112 and provides for communication among the components of game system 100. In yet other embodiments, advertising server 134 may be incorporated into game controller 160.

Resource server 136 is a network-connected server that provides static game-related resources to the plurality of client devices 110. Resources comprise game related content such as questions, polls, buyable items such as flair, pieces of face, and power-ups. Specific examples of resources and how resources are utilized in a live hosted online multiplayer game are provided with regard to the Online Administration module described below.

Game controller 160 instructs resource server 136 to provide resources to the plurality of game devices based upon events that occur in the event queue maintained by game controller 160. For example, in response to a show-question event, game controller 160 sends a show-question message to resource server 136. Resource server 136 receives the message and transmits the question content to the plurality of client devices 110 to be displayed on a user interface of the plurality client devices 110.

Live host console 140 allows a game show host to monitor the events of a game in real-time and to react to game events. For example, the game show host may monitor the number of correct and incorrect responses to a particular question and provide feedback to the players of the game. In an exemplary game situation, a question is posed to the players and game controller 160 receives a plurality of responses from the players and sends a summary of the results to live host console 140 which displays the summary for the game show host. The game show then reacts to those results by sending a text message to be displayed on a user interface of the plurality of client devices 110 participating in the game that states "Wow, only 30% of you got that one correct. It must be a toughie!" In other embodiments, live host console 140 is configured to transmit feedback from the game show host via an audio and/or video stream that is transmitted to the plurality of client devices 110. Live host console 140 captures an analog audio and/or video data stream and converts the data stream to a digital format before transmitting the data to the plurality of client devices 110. For example, in some embodiments, a live audio stream commentary from the operator host is converted to MP3 (MPEG-1 Layer 3) digital audio format before being transmitted to the plurality of client devices 110. The client devices 110 receive and play back the digital audio/visual data stream. Furthermore, in some embodiments, game system 100 comprises a plurality of live host consoles 140 allowing for multiple game show hosts to participate in the same live hosted online multiplayer game. Synchronization of system events is handled by game controller 160, which prevents the multiple game show hosts from accidentally issuing simultaneous commands that conflict with one another. In order to participate, each live host console 140 might send a request to execute an event to game controller 160 and game controller 160 handles the insertion of the event into the event queue. FIG. 5 describes a process 500 for inserting an event into the event queue.

Live host console 140 also provides a front-end for accessing game show data housed on the in memory database maintained by game controller 160 and for monitoring and controlling a number of game-related events. Live host console 140 provides a game show host with a variety of information required to administer an active game. For example, the game show host may request from live host console 140 a summary of a current game show session including information such as a theme (e.g., NBA Finals—Game 6) and a number of talking points that the host may wish to address during the course of the game show. In an embodiment, game server 130 and game controller 160 provide the information necessary for a game show host to administer an active game.

Furthermore, in an embodiment, live host console 140 provides the game show host with the ability to access and display on a user interface a variety of game related information including a wagering summary, a last question summary, poll results, affiliations summary, player information, and raffle details and results and the like. The wagering summary might provide details such as to the number or percentage of users participating in the live hosted online multiplayer game that have made wagers, an average wager per player, a percentage of successful wagers, an average successful wager amount, and/or total amount lost by users in wagers. The last question summary provides details such as the number of users participating in the live hosted online multiplayer game that attempted to answer the last question, the percentage of users that answered correctly, the difficulty level for the question. The poll results summary provides the number of users participating in the live hosted online multiplayer game that responded to a user poll, the number of players that responded who chose each the predefined responses to the poll and a percentage of players that selected each of the predefined responses to the poll.

The affiliations summary displays a listing of players who have selected an affiliation (a player chosen category such as "Yankees fan"). Affiliations are described in greater detail with regard to offline administration console 180 and the resource creation tool. The player information summary includes information for individual users in various categories such as top 10 users in a specific affiliation, top 10 users that have been online the longest, top point earners, top tokens earned (through wagers), top success percentages on wagers. The game show host may also view user demographics summarized into a number of categories. For example, the host may be able to view user demographics by geographic region (e.g., west coast, east coast, Midwest or by state). User demographic information may include a user population count grouped by geographic region and/or by affiliation. Live host console 140 also provides an interface for viewing raffle-related information including displaying the details of a raffle, displaying the winners of a raffle, and publishing the results to a console screen of live host console 140.

The game show host may select game-related information provided to live host console 140 to be published for display on a user interface of the plurality of client devices 110. In response to the selection to publish a set of data to the plurality of client devices 110, live host console sends a message to game controller 160 requesting that a publication event be placed on the event queue which results in content being published to the plurality of client devices 110 when the event is executed.

Offline administration console 180 provides a user interface for game show writers, producers and researchers to enter information necessary to create content for a live hosted multiplayer online game show experience. In an embodiment, the offline administration console 180 is a computer software package installed on a personal computer or PC. In alternate embodiments, the data entry and verification system may be a web-based application that is installed on a computer server and accessed via a web browser on a network-enabled device such as a personal computer or personal digital assistant. A description of the functionality provided by offline administration console 180 is provided in more detail below.

Figure 2:
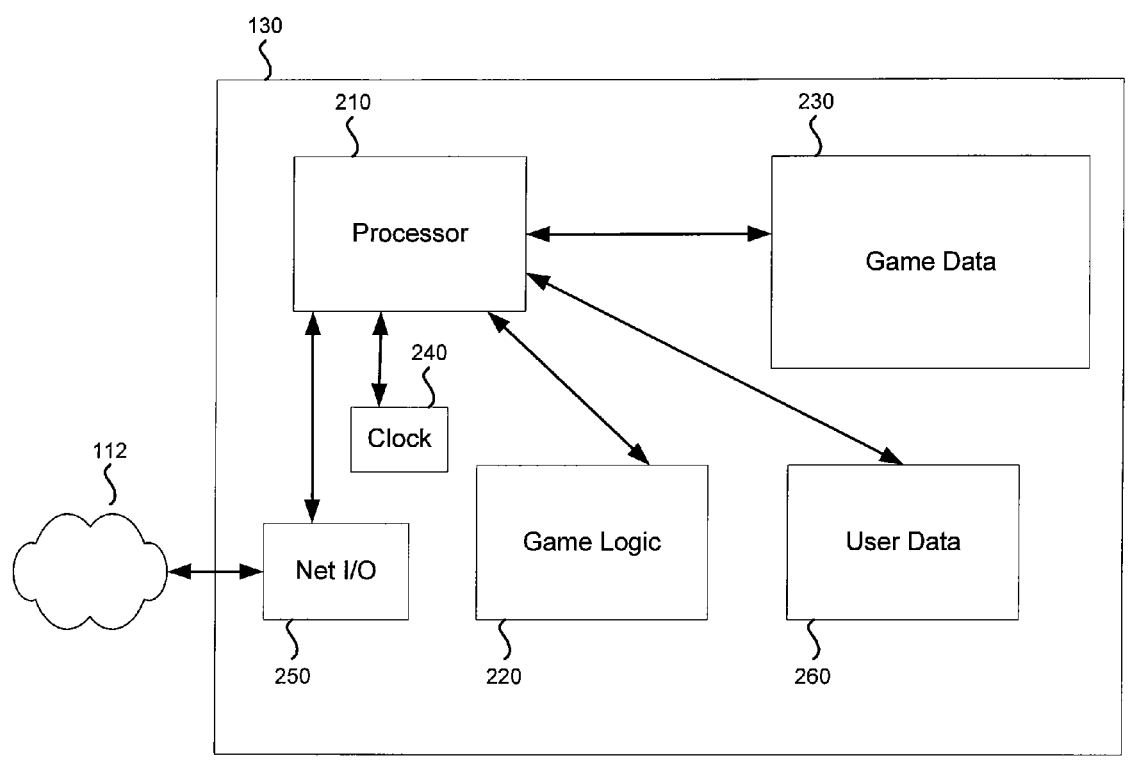
FIG. 2 depicts a block diagram of an exemplary game server that hosts one or more live hosted online multiplayer video games according to one embodiment of the present invention.

FIG. 2 depicts exemplary game server 130 according to one embodiment of the present invention. Game server 130 comprises processor 210, clock 240, game data 230, network interface 250, game logic 220 and user data 260. The game server may be conventional computer server or may be a computer server that is specially designed for online multiplayer game system 100. In an embodiment, game system 100 may comprise a plurality of game servers.

Network interface 250 provides connectivity to network 112 to enable game server 130 to communicate with the plurality of client devices 110 and game controller 160. Network interface 250 may comprise either a wired or a wireless connection network 112. Clock 240 is synchronized to a system clock maintained by game controller 160 in order to ensure proper synchronization of the components of game system 100. Much of the game-related content such as the display of questions is time sensitive and should be displayed in the proper order (e.g., questions are displayed before the answer and the players should all receive the questions at as close to the same time as possible). If internal clock 140 of game server 130 which serves content to the video game client 150 becomes unsynchronized with the clock on game controller 160, content may be served out the plurality of client devices at the wrong time by game server 130.

Game logic 220 is a set of game instructions and software for executing a game. The game logic may be stored in a permanent or semi-permanent form of memory such as a magnetic disk, optical media or read-only memory (ROM). Game logic 220 may also be stored in a volatile memory such as random-access memory (RAM) in other embodiments. Game logic 220 is accessed and executed by the processor 210 in order to execute the game. In some embodiments, game server 130 may support multiple games, and each game would require its own game logic 220. Furthermore, game server 130 may support multiple instances of a live hosted online multiplayer game being played concurrently. However, the multiple instances of the live host multiplayer game may share the same game logic 220.

Game data 230 is game related information stored in a computer memory. The memory may be any sort of read-write memory such as RAM or magnetic disk. Game data 230 comprises information describing the current state of a game being played on game server 130. In embodiments where multiple instances of an online multiplayer game are being played concurrently, game server 130 will comprise a separate game data 230 for each instance active instance of the game.

User data 260 consists of game related data that is specific to a particular user. Therefore, there will be at least one user data 260 for each user that is playing a game hosted by game server 130 upon which user data 260 is found. The user data may comprise such user specific information as the user's current score, the user's score history, user's favorites or preferences and/or a listing of the question or questions that the users has gotten correct. Additional user-specific information is maintained in the in-memory database maintained by game controller 160.

Figure 3:
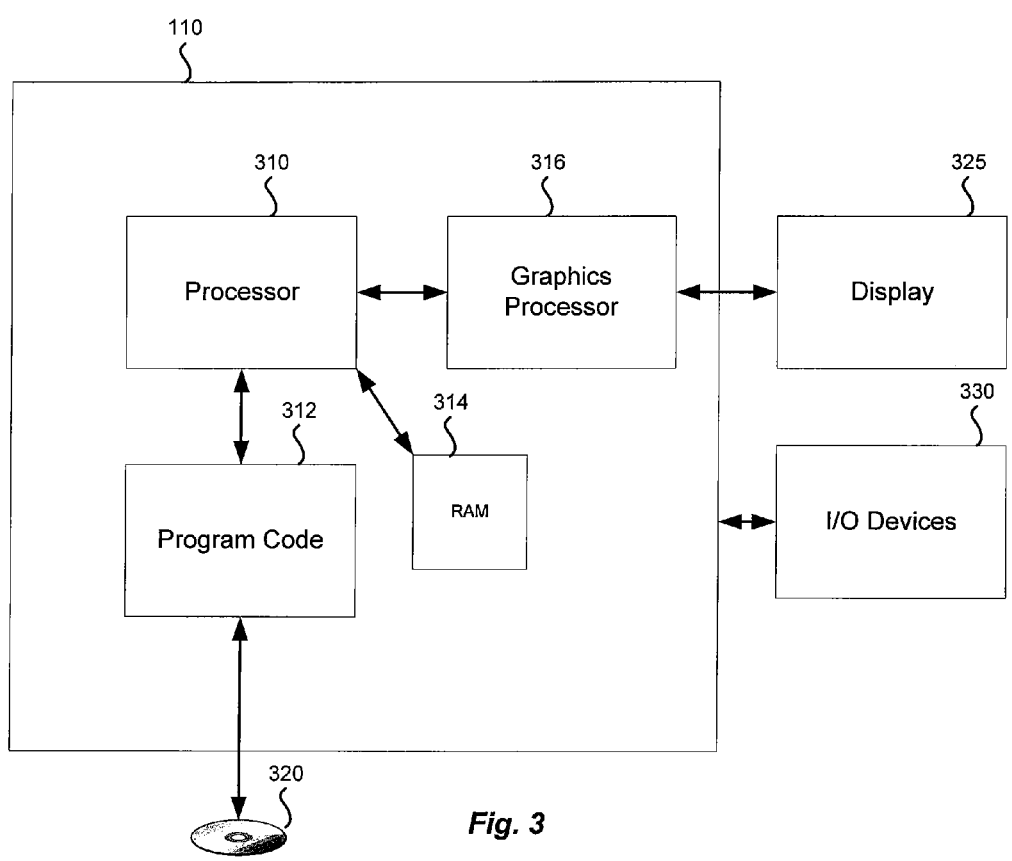
FIG. 3 depicts a block diagram of an exemplary video game client adapted to play a live-hosted video game according to one embodiment of the present invention.

FIG. 3 depicts exemplary client device 110 according to one embodiment of the present invention. Client device 110 is comprised of processor 310, program code 312, graphics processor 316, RAM 314 or other volatile memory, and computer-readable media 320. Client device 110 is also coupled to display device 325 and to one or more input-output devices 330 (I/O devices). Display device 325 and I/O devices 330 provide a user interface to client device 110 and a means for a user to interact with the live hosted online multiplayer game. In some embodiments, display device 325 is a stand-alone display device such as a computer monitor, television or LCD panel coupled to client device 110. In other embodiments, display device 325 is component integrated into client device 110. For example, client device 110 may be a laptop computer with an integrated LCD panel display. I/O devices 330 capture user inputs may comprise a joystick, a keyboard, an electronic tablet, a touch screen, a computer mouse, other devices enabled to capture user inputs and/or a combination thereof. I/O devices 330 also provide a network interface to enable client device 110 to communicate with the other components of game system 100, including game server 130, ticker server 132, advertising server 134, and resource server 136.

Computer-readable media 320 contains executable program code to be executed by processor 310. Computer-readable media 320 may comprise a removable media such as an optical disk (for example, a CD-ROM or DVD-ROM) or a cartridge. In some alternative embodiments, computer-readable media 320 may not be removable from client device 110. For example, the computer media may comprise a persistent memory such as a magnetic disk, optical disk, ROM or EPROM that is integrated into client device 110.

In some embodiments, client device 110 may also include program code 312 stored in an onboard memory. The onboard memory may, for example, comprise a read-write memory such as a magnetic disk, RAM, or an optical medium or, in some embodiments, may comprise a read only memory (ROM). In embodiments where the program code exists in a read-write memory, program code 312 may be a copy of program code from computer-readable media 320 or from an external source such as game server 130. Program code 312 may be executed by processor 310 in conjunction with or independently from the executable program code found on computer-readable media 320.

Figure 7:
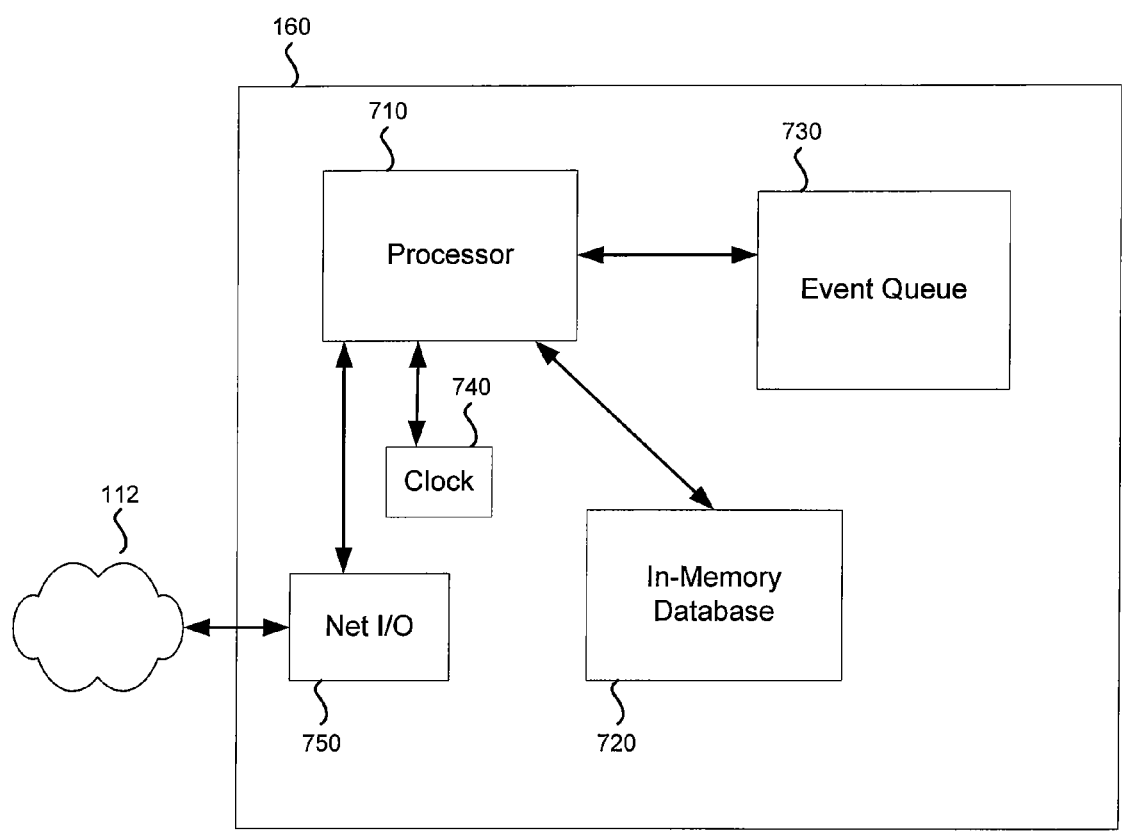
FIG. 7 depicts a block diagram of an exemplary game controller which controls the operation of one or more online multiplayer video games.

FIG. 7 depicts a block diagram of an exemplary game controller which controls the operation of one or more online multiplayer video games according to one embodiment of the present invention. Game controller 160 is comprised of processor 710, clock 740, network interface 750, in-memory database 720, and event queue 730.

Network interface 750 provides connectivity to network 112 to enable the game controller 130 to communicate with resource server 136, advertising server 134, the ticker server 132, game server 130, and the plurality of client devices 110. Network interface 750 may comprise either a wired or a wireless connection to network 112. Clock 740 is maintained by game controller 160 in order to ensure proper synchronization of the components of game system 100. Clock 240 of game server 130 is synchronized to clock 740 of the game controller 260. Furthermore, live host console 140 receives clock synchronization messages from game controller 160 to synchronize the clock of live host console 140 with clock 740.

Processor 210 executes updates to event queue 730 and in-memory database 720. The in-memory database maintains game state data and the game controller provides a facility for querying the data to retrieve current game state information by live host console 140 in order to provide a game show host with updated information related to the status of a live hosted multiplayer online game. The game controller also maintains event queue 730 to control the execution of events within game system 100. Game controller 160 receives messages requesting that events be inserted into the queue and game controller 160 creates a new event and inserts into the appropriate position in event queue 730.

Creating Game Show Content with the offline administration console

Before a live hosted online multiplayer game is ready to be played by users, game content is created and entered into game system 100 via offline administration console 180. Offline administration console 180 is a collection of tools enabling a production team to define, manage, and monitor the resources that of game system 100. In an embodiment, offline administration console 180 and live host console 140 are integrated into a single software package where access to specific functionality is determined by a user login and password combination.

System Administration

Offline administration console 180 has a system administration module that enables a system administrator to define a set of users and to assign roles and permissions to those users. The system provides a user interface for entering and/or editing information associated with each user such as a username, the user's first and last names, a contact phone number and email address for the user.

A permission defines the level of access to a specific set of functionality that a user is granted. For example, a permission may be defined for creating new questions or polls. Permissions may be directly associated with a particular user in order to enable the user to access the functionality tied to that particular permission.

A role comprises a functional grouping of permissions and provides the system administrator with the ability to associate a set of permissions with a user without having to individually assign each permission. Instead, the user is assigned a role or set of roles that have permissions assigned to them. However, the system administrator may also assign individual permissions to a user when necessary. In an embodiment, roles are defined to correspond to jobs associated with the maintenance and operation of the multiplayer online game system 100. For example, an executive producer role may be created that comprises all of the permissions required for an executive producer such as being able access and edit game show schedules. Similarly, a resource creator role may be created for resource creators whereby the role comprises permissions necessary for entering and editing data of game show resources such as questions, polls, and prizes. Thus, a resource creator would not be able to access the scheduling functionality that an executive producer would be able to access, while the executive producer would lack the permission to create new resources.

Resource Creation

Game system 100 utilizes a number of resources that are created before the game system is ready to host users. Offline administration console 180 provides a number of tools for creating and managing resources including: a question management user interface, a poll manager, a category and keyword manager, a theme manager, a metadata manager (for associating metadata with assets), a raffle manager, a skin manager, an affiliations manager, registration manager, a tokens manager, a wagering odds manager, a player levels manager, and a game ticker message manager.

The question management user interface enables a user to enter, edit, or delete questions to be used in a game show. The interface also allows the user to browse through a list of existing questions and access and/or edit the contents of the existing questions. The question manager provides the user with the ability to enter data such as a question id, question type, question text, an answer set (including an indicator for determining which of the answers is correct), and a difficulty rating for each question. Questions may also be associated with keywords and/or categories in order to assist in assembling questions to produce a game show program. The number of questions stored in the system may become extensive overtime and it would be unduly burdensome on a user to have to locate questions by scrolling through the list of questions. Therefore, the question management user interface provides a search interface where a user may enter a variety of search criteria for finding existing questions, such as a question id, and a set of keywords to search for in the question text and/or answer text. In some embodiments, the question manager is adapted to link audio and/or video files to questions where the audio and/or video content is presented in addition to or instead of question text. A user may associate the audio and/or video content with the by providing a uniform resource locator (URL) identifying the location of the audio and/or video content.

The poll manager user interface enables a user to enter, edit, or delete user polls to be presented to users during a game show. A user poll comprises a poll question seeking user opinion on a survey-type question and a set of responses associated with the poll question. The user votes on a response and the votes from all of those who participated in the survey are tallied to produce a set of poll results. The poll manager user interface provides the user with the ability to enter data such as a poll id, a question type, a poll question text, an answer set (a set of answers related to the poll question upon from which users will select one answer). The poll manager user interface allows polls to be associated with keywords and/or categories. A search interface is also provided for searching for existing user polls.

The category and keyword manager user interface enables a user to enter keywords and categories. Keywords are associated with content such as questions and polls to enable game show producers to more readily find content relevant to a particular topic. Categories are broad groupings associated with sets of keywords. For example, a user may define a category "sport" and associate the keywords "baseball," "football," and "hockey" to the category. Content such as questions and polls may be linked to both keywords and to categories in enable a game show producer to select content related to very specific topic by searching by keyword and or content related to a broader set of topics by searching by category.

The theme manager user interface enables a user to create and edit themes. Themes are collection of category and keyword pairs that are appropriate for a particular game session. For example, a user might create a "NBA" theme which is associated with the category "sport" and the keyword "basketball" in order to find all National Basketball League related polls and/or questions stored in the system. When a user creates a new poll or question, the user associated keywords and/or categories with the newly created poll or question.

The metadata manager user interface enables a user to enter and edit metadata associated with resources. For example, in an embodiment of the present invention, users can purchase items including pieces of face, pieces of flair, and power-ups. In an embodiment, the pieces of face are used to provide a graphical representation of the user in the game environment and include component such as skin color, eye color, chin and nose. In an embodiment, pieces of flair are graphical icons that can be associated with a user in the game environment to serve a decorative purpose. Users may collect and/or trade the pieces of flair. A user may purchase a piece of flair for a specified number of tokens (entered via the metadata manager user interface) or may win the piece of flair as a prize in a raffle. In an embodiment, power-ups comprise a set of virtual objects that user can acquire within the live hosted multiplayer online game to provide an advantage to the user such as multiplying the number of tokens that a user possesses or the user's current score by a predetermined multiplier, stopping the game clock for a limited amount of time, or eliminating one or more answer options from an answer set.

The raffle manager user interface allows a user to create, edit or delete a raffle. The user interface allows the user to enter data related to a raffle such as an identifier of an item to be awarded as a prize in the raffle, a number of items to be raffled, a description of the item(s) to be raffled, and a location of an image of the item. The interface also allows for raffles to be scheduled to run automatically by providing a start and end time for the raffle. The raffle manager user interface also displays the winners of a raffle that has already been completed. Raffles that are not scheduled may also be run manually from live host console 140 by a game show host.

The skin manager user interface provides a user with the ability to define a set of parameters to provide a customized look and feel to the user interface presented by the plurality of client devices 110. Skins may be utilized in a number of ways in a game. For example, skins may be associated with particular game sessions, may be associated with particular users when a user achieves a certain goal or level within the live hosted online multiplayer game, or may be won as a prize during game play.

The affiliations manager user interface enables a user to create, edit and delete affiliations and affiliation categories. Affiliations are identifiers associated with a player. Affiliation categories are groups of affiliations. Affiliations may be selected by a player when a player registers with the live hosted online multiplayer game or may automatically be selected by game system 100 based upon user demographic information. For example, a user might create an affiliation category based upon geographic location called "Location" and associate it with a set of geographic affiliations such as "United States," "Canada," "Australia," and "United Kingdom." The affiliations may then be associated with a player during the registration process either automatically or through player input.

The registration manager user interface allows a user to add, edit, and delete player information. Information such as the first and last name of the player, a postal address, an email address and user preferences may be entered through the registration manager user interface. In an embodiment, the registration manager interface allows the user to enter player preferences such as email newsletter and ticker news feed subscriptions. In some embodiments, a separate user options screen is provided for adding, editing, and deleting user preferences associated with players.

The global tokens manager user interface allows a user to edit token settings that apply to the entire game environment of a live hosted multiplayer online game. Tokens represent a type of currency in the game environment. Tokens may be used to purchase items in the game such as power-ups that give a player an advantage for a limited period of time. Tokens may, for example, be awarded to players for correctly answering questions, awarded based upon other predefined criteria, or awarded at the discretion of a game show host presiding over a game. Players may also wager tokens in a game and receive tokens in return for answering a certain number of questions correctly in some embodiments. The global tokens manager user interface provides the user with the ability to configure token-related settings such as the initial number of tokens a user will have, a token limit describing the maximum number tokens that a user may have, the number of tokens received for a correct answer, and the number of tokens awarded for taking a poll.

The wagering odds manager user interface allows a user to maintain a set of odds associated with a set of percentages of questions answered correctly. The wagering odds are used to determine an amount of tokens to pay out to a player in return for player getting a certain percentage of questions correct during a game session. For example, the odds may be 1 to 1 where the user gets 50% of the questions correct, meaning that the user will receive 1 token for each token wagered on the game session. However, the odds may increase to 5 to 1 where the user gets 85% of the questions correct, meaning that the user will receive 5 tokens for each token wagered on the game session.

The player levels manager user interface enables a user to add, edit, and delete user level information. User level information comprises a set of levels that a player may achieve by successfully answering a specified number of questions correctly. The user interface also provides the ability for a user to associate prizes to be awarded to a player upon reaching each level. For example, the user may enter a number of tokens or a piece of flair to be awarded to a user upon achieving a level. In an embodiment, the piece of flair comprises a badge icon that is associated with a player achieving a specific level. The badge icon associated with each level is unique such that the badge icon is a readily identifiable indicator that a player has achieved a specified level. The badge icon may be displayed on the user interface of the player achieving the level and may be displayed on game screens referencing the user such as a list of high scores for a particular game.

The game ticker message manager user interface enables a user to add, edit and delete ticker messages. In an embodiment, a user enters predefined ticker messages that may later be selected for display during a game show. For example, in an embodiment, a user enters ticker-based advertisements received from advertisers prior to a game show session being started. A producer putting together a game show can then select these predefined advertisements from sponsors when scheduling content for a game session. In addition to entering predefined ticker messages created using the game ticker message manager user interface, a game show host may publish ticker messages via live host console.

Schedule Creation

The offline administration console provides a set of tools that enable a user to create and to manage a scheduled lineup of game show programming, to define session structures used to schedule a live game show session, and to create programming schedules for actual instances of live game show sessions by adding content such as questions, polls, and ads to the live game show sessions. In an embodiment of the present invention, the schedule creation tools include: weekly schedule templates user interface, session templates user interface, broadcast schedule interfaces including a daily and a weekly schedule interface, and a session editing interface.

The weekly schedule templates user interface enables a user to define and modify weekly schedule templates and to generate a week's worth of game show sessions based upon defaults stored in a weekly template. To generate a week's worth of game show sessions from an existing template, the user selects a template from a list of templates, selects a week to schedule. The selected week is populated with the programming contained in the selected template. The user then has the option to adjust the weekly programming by editing the default programming provided by the template.

A user may also define a new weekly template through the weekly schedule templates user interface. In defining a weekly template, the user selects a start time of the first and last game show sessions for each day of the week and defines a default game show session length. The default session length denotes how much time should be blocked out for each game show session placed in the template. The user can then generate a default schedule template that is filled in with session stubs for all of the shows to be scheduled for the week.

Once the weekly template has been populated with the default session stubs, the user has the option of defining additional data for each of the game show sessions. In some embodiments, the weekly template is color coded to identify portions of the weekly schedule that for which the programming content has not been completely defined. For example, a game show session that is completed undefined is bordered with a black border, while a game show session that is partially defined (some but not all of the data required to schedule the show has been provided) is bordered in yellow, and a game show session that has been completely defined is bordered in green. In an embodiment, the weekly template user interface also provides a search and replace feature that allows the user to quickly perform a search and replace on items in the game show sessions. For example, if there is a programming schedule change and a new session theme is required, the user may conduct a search and replace on all session themes of a first type found in the weekly template and replace them with a session theme of a second type.

The session templates user interface allows a user to edit a template for a single game show session. The user interface allows the user to define the length of the game show, the timing of content (i.e., when should the content be broadcast to the client devices) such as questions, polls, and advertisements. The user can insert any number of events that will fit within the total time allotted for the game show session. Once the user has completed editing or creating a new template, the user saves the template and the template can be used to populate default game show session data in a broadcast schedule.

The session editing user interface provides an interface for editing an individual broadcast session. The session editing user interface allows a user to add, delete or edit content to be displayed during a game show session such as questions, polls, advertisements and/or audio/video content. The user can select a template created using the session templates user interface to provide a starting point for creating a game show session or the user may create a new session from scratch. The user interface allows the user to set the length of the game show session, to choose a theme, to choose a game show host, and to select a producer for the session. The user may manually select questions and polls to be displayed during the game show session or allow the system to randomly choose questions and polls associated with the theme chosen for the game show session.

Then offline administration console provides two user interfaces for viewing game show broadcast schedules: a daily schedule interface and a weekly schedule interface. The daily schedule provides a view of scheduled programming for an entire day. The weekly schedule provides a view of scheduled programming for an entire week. Both views allow a user to select specific game show sessions for editing and allow a user to add or delete sessions from the broadcast schedule.

Live Host Console

Figure 4:
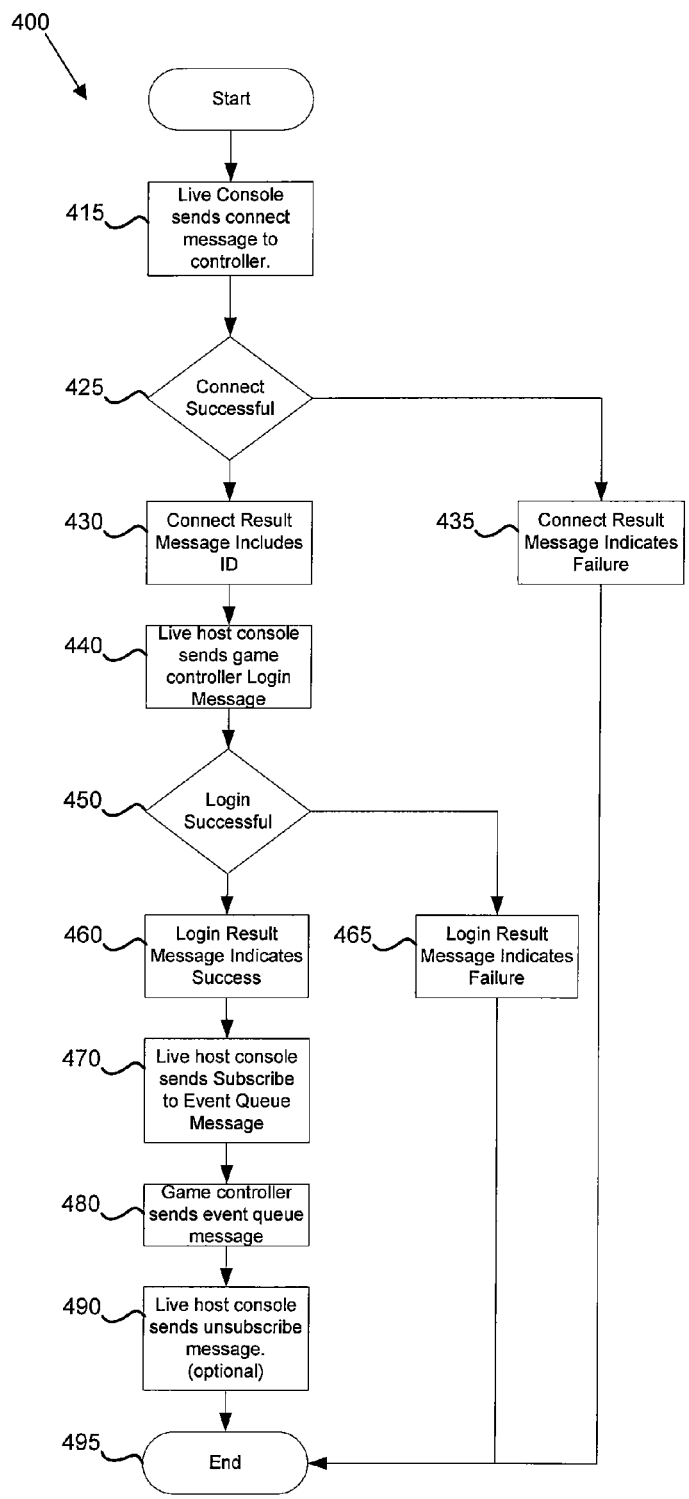
FIG. 4 depicts a flow diagram of a process for registering a live host console with a game show system.

Before a user can use live host console 140 to host a live hosted online multiplayer game, live host console 140 registers with game controller 160 and the user logs into the system. FIG. 4 is a flow diagram of a process for registering live host console 140 with game controller 160 according to one embodiment of the present invention. The process begins with step 415 where live host console 140 sends a connect message to game controller 160. In a preferred embodiment, the connect message is an XML data string and comprising an empty tag "<connect/>" that alerts the game controller that a live host console is attempting to establish a connection. In step 425, a determination is made whether the connect request was successful. If the connect request was successful, the process continues with step 430. Otherwise, if a connection could not be established, the process continues with step 435. In step 435, the game controller sends a connect-result message to live host console 140 indicating that a connection could not be established and the process terminates at step 495.

Continuing with step 430, game controller 160 sends a connect-result message to live host console indicating that the connection was successful. The connect-result message includes identifiers for one or more event queues maintained by game controller 160.

Once a connection is established, a user logs into game controller 160. In step 440, live host console 140 sends a login message to game controller 160 comprising a username and password of a user that wishes to connect to game controller 160. In an embodiment, the login message may also comprise a port on game controller 160 to which the live host controller 140 is to be connected. In step 450, game controller 160 makes a determination whether the user's login credentials are valid. If the username and password combination provided is not valid, game controller 160 sends a login-result message indicating that the login failed (step 465) and the process ends (step 495).

Continuing with step 460, game controller 160 sends a login-result message indicating that the login was successful. The login-result message comprises a set of permissions associated with the user who has logged into game controller 160 live host console 140. The permissions associated with the user indicate what actions the user may take, such as starting a game or publishing content to players connected to a game. The process continue with step 470, where live host console 140 sends a subscribe-to-event-queue message to game controller 160 in order to obtain a copy of the event queue contents from game controller 160. Game controller 160 maintains a set of event queues for a live hosted multi-player online game. In an embodiment, there are multiple event queues to which live host console 140 may subscribe. Therefore, the subscribe-to-event-queue message will contain a name identifying an event queue to which live host console 140 is attempting to subscribe.

In response to the subscribe-to-event-queue message, game controller 160 sends an event-queue message including a timestamp indicating the time that the snapshot of the queue was taken and a set of events pending on the queue (step 480). A detailed description of the types of events found in game system 100 is provided below. Once live host console 140 has subscribed to an event queue, game controller 160 will send an event-queue message to live host console 140 each time the queue is updated. Live host console 140 may unsubscribe to a queue in order to stop receiving updates (step 490) by sending an unsubscribe-to-event-queue message to game controller 160. In embodiments where live host console 140 may subscribe to multiple event queues, the unsubscribe-to-event-queue message will include an event queue name identifying a specific queue from which live host console 140 is unsubscribing. Game controller 160 will continue to send event-queue messages related to any other queues to which live host console 140 is still subscribed any time that there is an update to one of those queues. The process terminates at step 495.

Events and Event Handling

Game controller 160 maintains an event queue containing all of the events for a currently active game session. As the contents of an event queue change, event-queue messages are transmitted to any live host consoles 140 that are registered with game controller 160 and subscribed to the queue that has changed. Event related messages may also be transmitted to a plurality of video game devices 110 registered with game controller 160. Game controller 160 also maintains an in-memory database containing game and population statistics for the current game.

The event queue might comprise three types of events: screen events, ticker events, and sound events. In a preferred embodiment, the events are stored in the queue as a XML string comprising an event type and a set of parameters related to the event. One skilled in the art will recognize that events may be represented in the event queue in a variety of means well known to the art and the use of XML strings in the present embodiment does not limit the scope of the claimed invention.

Screen Events

Screen events cause an update to the user interface of the plurality of client devices 110 registered with game controller 160. In the present embodiment, the screen events include: show-question, show-poll, show-poll results, and show-game-leaders. In an embodiment, the game controller instructs game server 130 to serve content to the plurality of client devices that the plurality of client devices will display on their user interface in response to a screen event.

The show-question event instructs the plurality of client devices to display a game show question on their user interface. The game show question comprises a set of text, video and or audio which poses a trivia-type question and a set of pre-defined answers from which the user selects when answering the question. In an embodiment, game controller 160 sends a show-question message to the plurality of client devices 110 comprising question text to be displayed to the user, a question number to identify the question, a set of answers from which the user will select a response, and a correct answer to the question. In embodiments where the show-question message includes both the question and the answer to the question, the message includes a parameter indicating how much time should elapse before displaying the correct answer and before displaying the question results.

In alternative embodiments, the question and answer may be sent in separate messages. For example, the question is sent in a show-question message, the set of answers is sent in a show-question-answers message, and the correct answer to the question is sent in a show-question-answer message. Game controller 160 can control the timing of the display of the question, answers and correct answer by sending the message comprising the question, answer, and correct answer at pre-defined intervals to insure that the game content is received in the proper order by the plurality of client devices 110.

In yet other embodiments, game controller 160 transmits the show-question message to game server 130 which transmits the messages to the plurality of client devices 110 in addition to any additional content that is required from the game server to properly display the question. For example, the question may include audio and/or video content that game server 130 will stream to the plurality of client devices 110 for display with the question.

The show-poll event is handled in a manner similar to the show-question event. The show-poll event is used to conduct a user poll. A poll comprises a poll question and a set of pre-defined response from which the user may choose a response. Game controller 160 generates a show-poll message that is transmitted to the plurality of client devices 110 instructing the client devices 110 to update their user interface to display the poll content included in the show-poll message. The show poll message comprises poll text to be displayed to the user, a poll number to identify the poll, a set of answers from which the user will select a response, and an amount of time to display the poll on the plurality of client devices 110. In an embodiment, game server 130 receives poll responses from the plurality of client devices 110 and forwards those responses game controller 160. Game controller 160 then updates its in-memory database with the poll results.

The show-poll-results event instructs the plurality of game clients to display the results of a poll on their user interface. Game controller 160 generates a show-poll-results message and transmits that message to the plurality of client devices 110 registered with game controller 160. In the present embodiment, the show-poll-results message includes the text of the poll, a number of responses associated with each answer (including a total number of votes and a percentage of the total votes), and display format (e.g., bar graph)). Client device 110 receives the message via the network connection 112 and updates its user interface to display the contents of the message. The display format parameter of the show-poll-results messages dictates the format in which client device 110 should display the poll results. The client device may support a variety of display formats, such as, a bar chart, a pie chart, or a text table.

The show-game-leaders event instructs the plurality of client devices to display a listing of a specified number of top players in a game. Game controller 160 generates a show-game-leaders message and transmits the message to the plurality of client devices 110 registered with game controller 160. In the present embodiment, the show-game-leaders message comprises a set of leaders with a rank, a score, a username, and a face ID associated with each gamer. The face ID string (e.g., F9AE43A7) is used to match the username to the proper face image displayed as a visual representation of the character. Faces are described in further detail in the "Resources" section. The plurality of client devices 110 receives the show-game-leaders message and updates its user interface the display the game leader information.

Ad Hoc Events

Ad hoc events are events that provide live host console 140 the ability to request that game controller 160 instruct the plurality of client devices 110 to display text, images, and/or video content on their user interfaces. In the present embodiment, the ad hoc events include show-text, show-video, show-image, and show-raffle-winners. In an embodiment, the game controller instructs game server 130 to serve content to the plurality of client devices that the plurality of client devices will display on their user interface in response to an ad hoc event.

The show-text event causes the plurality of client-devices 100 to display the specified text on their user interface. Live host console 140 generates a show-text message comprising the text to be displayed and transmits the message to game controller 160. Game controller 160 transmits the show-text message to the plurality of client devices 110. The show-text event could be used, for example, by a game show host to send out an interesting quote from a recent news article to all of the players participating in a game show. The game show host enters the text via a user interface provided by live host console and submits the text to be distributed to the plurality of client devices 110 by game controller 160.

The show-video event causes the plurality of client-devices 100 to play a specified video file on their user interface. In the present embodiment, live host console 140 generates a show-video message comprising a video to be displayed and transmits the message to game controller 160. Game controller 160 then transmits a show-video message to the plurality of client devices 110 and the plurality of game clients update their user interface to display the specified video upon receipt of the message.

Video may be streamed from the network or from a local cache. In some embodiments, the local cache is located on game server 130 and, in other embodiments, the local cache is located on client device 110. The show-video event may be issued, for example, to play a video related to an advertisement. In some embodiments, ad-related video content may be tagged to indicate that it is ad content and the content is to receive additional processing. The show-video message can include a URL identifying the video file. In alternative embodiments, the video file may be attached to the message send to client device 110.

The show-image event causes the plurality of client-devices 100 to display a specified image file on their user interface. In the present embodiment, live host console 140 generates a show-image message comprising an image file to be displayed and transmits the message to game controller 160. Game controller 160 then transmits a show-image message to the plurality of client devices 110 and the plurality of client devices 110 update their user interface to display the specified image upon receipt of the message. In some embodiments, the show-image message indicates whether the image is an advertisement. If the image is an advertisement, it may be displayed in a banner advertisement portion of the user interface of the plurality of client devices 110.

The show-raffle-winners event causes the plurality of client-devices 110 to update their user interface to display a list of the winners of a specified raffle. In the present embodiment, live host console 140 generates a show-raffle-winners message comprising a list of winners of a particular raffle and transmits the message to game controller 160. Game controller 160 then transmits a show-image message to the plurality of client devices 110 and the plurality of game clients update their user interface to display the specified image upon receipt of the message.

The number of winners for a particular raffle depends upon the definition of the raffle, and in some embodiments, the list of winners may require several screens to display all of the winners. In other embodiments, the list of winners is displayed in a scrollable portion of the user interface of the plurality of client devices 110.

Ticker Events

A ticker event instructs the plurality of client devices 110 to display a message in a ticker portion of the user interface of the plurality of client devices 110. In some embodiments, a priority is assigned to the ticker event. If the number of ticker events that generated exceeds that which a client device can display within the ticker portion of its user interface, client device 110 may ignore the ticker events with a lower priority and display only those ticker events with a higher priority. In an embodiment, a ticker-ad event instructs the plurality of client devices 110 to display an advertising message in the ticker portion of the user interface of the client devices 110. In some embodiments, game controller 160 transmits a ticker request to a ticker server 132 and the ticker server transmits the ticker message to the plurality of client devices 110. In some embodiments, the ticker is not used or present.

Sound Events

Sound events cause the playing of audio content on the plurality of client devices 110. Sound events comprise a play-audio event inserted onto the event-queue maintained by game controller 160. In an embodiment of the present invention, the play-audio event includes the URL of a sound file to be played on each of the client devices 110. The audio file may be streamed from the network or it may be played from a local cache. In some embodiments, the local cache is located on game server 130 and, in other embodiments, the local cache is located on client device 110. Furthermore, in some embodiments, the play-audio event includes a flag indicating that the audio content is an advertisement. In alternative embodiments, a second event type play-audio-ad is utilized to indicate that the audio file contains advertising content. Advertising content may, for example, require additional processing or may receive a higher priority than non-advertising content in order to ensure that a sponsor's content is received and played by the plurality of client devices 110. Advertising content may also, in some embodiments, be stored on advertising server 134, and game controller 160 may request that the advertising server transmit the advertising content to the plurality of client devices 110.

Inserting Events into Game Controller Event Queue

Live host console 140 may request that game controller 160 places an event in the Game Show controller's event queue by sending a message to game controller 160. In the present embodiment, the messages that live host console 140 may send to game controller 160 include: publish-poll, publish-poll-results, publish-game-leaders, publish-video, publish-image, publish-raffle-winners, publish-text, publish-audio, and publish-ticker. The message may include a "scheduled" tag that indicates that the event should be executed at the time specified in the messages. However, if no "scheduled" tag is included in the message, the event will be placed at the front of the event queue and will executed after any currently executing events.

Messages may also include executable scripts to be executed by one or more components of the live-hosted multiplayer online game system including game controller 160, game server 130, live host console 140, and/or client device 110. For example, in an embodiment, a message may include executable JavaScript to be executed by the plurality of client devices 110. When the plurality of client devices 110 receive the message including the script, the message will be read and the script executed by the plurality of client devices to perform a specified task.

The publish-poll message requests that game controller 160 insert a show-poll into the game controller's event queue in order to get a specified poll displayed on the plurality of client devices 110. Game controller 160 collects the results of the poll. In the present embodiment, the publish poll message includes a poll-id number, a set of responses, and a display time indicating how long the poll should be displayed to the client devices.

The publish-poll-results message requests that game controller 160 insert a show-poll-results event into the event queue in order for the results of a specified poll to be displayed on the plurality of client devices 110. In the present embodiment, the publish-poll-results message comprises the text of the poll, the set of responses, a display time, and a display format (e.g., a bar graph).

The publish-game-leaders message requests that game controller 160 insert a show-game-leaders event into the event queue in order for the results of a specified poll to be displayed on the plurality of client devices 110. In the present embodiment, the publish-game-leaders message includes scheduled tag indicating whether the event is to be scheduled, and for each of a set of game leaders the message includes a leader rank, username identifying game leader, a score, and a face ID for visually representing the player.

The publish-video message requests that game controller 160 insert a show-video event into the event queue. The publish-video message includes information required to create the show-video event. In an embodiment of the present invention, the publish-video message includes a Uniform Resource Locator (URL) identifying a specific video file to be played on the plurality of client devices 110. The publish-video message may include a scheduled flag indicating a specific time that the video content should be played.

The publish-image message requests that game controller 160 insert a show-image into the event queue. In the present embodiment, the publish-image message includes a Uniform Resource Locator (URL) identifying a specific image file to be displayed on the plurality of client devices 110.

The publish-raffle-winners message requests that game controller 160 insert a show-raffle-winners event into the event queue. In the present embodiment, the publish-raffle-winners message includes a prize-image, a set of winners comprising a winner identifier (e.g., a username) and a winner's face.

The publish-text message requests that game controller 160 insert a show-text event into the event queue. The text to be displayed on the user interfaces of the plurality of client devices 110 is included in the message.

The publish-ticker message requests that game controller 160 insert a ticker event into the event queue. In the present embodiment, the publish-ticker message includes text to be displayed in a ticker portion of the user interface of the plurality of client devices 110.

The publish-audio message requests that game controller 160 insert a play-audio event into the event queue. In the present embodiment, the publish-audio message includes a URL for the audio content to be played on the plurality of client devices 110.

In some embodiments, the game show host may highlight or spotlight certain players. For example, the game show host may highlight a player that has answered a series several very difficult questions or a player that has achieved an advanced player level in the live hosted multiplayer online game. The game show host may invoke a ticker message comprising a message congratulating the player by sending a publish-ticker message to game controller 160. In other embodiments, the game show host may transmit a voice recording congratulating the player by transmitting a publish-audio message to game controller 160. In yet other embodiments, the game show host may send a text message congratulating the player in a publish-text message to game controller 160.

Raffles

Players can use software on the plurality of client devices 110 to indicate their participation in upcoming raffles. In some embodiments, when a raffle is run, a game show host uses live console 140 to pick a random winner or set of winners from the list of those users who indicated their participation in the raffle. In some embodiments, the game show host uses live voice streaming to announce the winner to the plurality of game clients 110. In other embodiments, the game show host uses live voice streaming to announce the winner of the raffle only to the subset of client devices that participated in the raffle.

Raffle messages are a set of messages that enable live host console 140 to manage the execution of a raffle. In the present embodiment, the raffle messages include: raffle-details, raffle-results, and publish-raffle-winners. Raffles are setup via the Raffle Management user interface of offline administration console 180.

Raffle messages may also include executable scripts to be executed by one or more components of the live-hosted multiplayer online game system including game controller 160, game server 130, live host console 140, and/or client device 110. For example, in an embodiment, a raffle message may include executable JavaScript to be executed by live host console 140. When live host console 140 receives the raffle message including the script, the message will be read and the script executed by live host console 140 to perform a specified task, such as display the results of the raffle on a user interface of live host console 140.

The raffle-details message is provided by game controller 160 to live host console 140 providing the details of raffle to a live host console user. The raffle-results message reports the results of a raffle to live host console 140. The information included in the message is a raffle id and a set of raffle winners identified by a username. Live host console 140 receives the message and displays the results of the raffle on its user interface to allow a game show host or live producer view the results of a raffle. In some embodiments, the live host In some embodiments, the game show host may publish a publish-raffle-winners message in order to instruct game controller 160 to insert a show-raffle-winners event into the event queue so that the winners of the raffle are displayed on the user interface of the plurality of client devices 110. The publish-raffle-winners message may be issued by the game show host either in addition to or instead of announcing raffle winners via voice streaming to the plurality of client device 110 as describe above.

Inserting Events into Game Event Queue

FIG. 5 is a flow diagram of a process 500 for inserting an event into a game event queue according to one embodiment of the present invention. In step 515, game controller 160 receives an event message requesting an event be placed in the game event queue. An event may be placed in the queue on-demand (i.e., the event will be executed as soon as it reaches the front of the queue) or scheduled (i.e., the event will not be executed until a specified time). Once game controller 160 has received the event, the event will be checked to determine whether the event is valid (step 525). If the event is not a valid event type, then the event is ignored and the process terminated at step 570. Otherwise, the process continues with step 535.

In step 535, the game controller determines whether the event is a scheduled event. In a preferred embodiment, the event message comprises an XML string with an <event> tag that includes a "scheduled" parameter indicating a date and time for which an event is to be schedule. If the scheduled parameter is present, the event will not be executed until the date and time indicated in the event message. Otherwise, if the event is not scheduled, it will be placed into the game event queue.

In step 545, game controller 160 makes a determination whether there is an active event in the game event queue. If there is an active event, then the new event is inserted into the game event queue after the active event (step 550). Otherwise, if there is no active event, the new event is inserted at the front of the game event queue. The process continues with step 560, where game controller 160 notifies the one or more live consoles registered and logged into game controller 160 that a new event has been added to the event queue.

Queries and Reporting Facilities

Game controller 160 provides for reporting game-related statistics to live host console 140. Reporting is accomplished through the registration of queries with game controller 160. Live host console 140 can subscribe to one or more registered queries. The registered queries are run against an in-memory database maintained by game controller 160 and the results are reported out to live host consoles 140 subscribing to those queries. In an embodiment of the present invention, query-related functions are handled by a set of messages including: register-custom-query, subscribe-to-query, retrieve-registered-queries, and registered-queries.

Query messages may also include executable scripts to be executed by one or more components of the live-hosted multiplayer online game system including game controller 160, game server 130, live host console 140, and/or client device 110. For example, in an embodiment, a query message may include executable JavaScript to be executed by the plurality of client devices 110. When the plurality of client devices 110 receive the query message including the script, the message will be read and the script executed by the plurality of client devices to perform a specified task.

The register-custom-query message is sent by live host console 140 to game controller 160 to register a user-defined query. The message comprises a name with which to identify the query and a query. In an embodiment, the query comprises a SQL (Structured Query Language) select statement that is used to select data from a set of tables in the in-memory database.

The subscribe-to-query message is sent by live host console 140 to game controller 160 to subscribe to a query registered with game controller 160. The message includes the name of a query to which live host console 140 is to be subscribed. Once live host console 140 has subscribed to a query, the query results will be returned to the console by the controller. Query results are described in more detail in the Query Results section.

The retrieve-registered-queries message is sent by live host console to request a list of all queries registered with game controller 160.

The registered-queries message is sent by game controller 160 to live host console 140 in response to the retrieve-registered-queries message. The registered-queries comprises a list of the names of all of the queries registered with game controller 160.

Query results are transmitted by game controller 160 to live host console 140 in a message. The message comprises a set of data returned by executing a registered query against game controller 160 in memory database. The following are exemplary query result types that are utilized in an embodiment of the present invention. One skilled in the art will recognize that additional query result types may be defined depending upon the information to be retrieved from game controller 160.

The session-summary-details query selects information related to a current game session such as a session id, a theme associated with the session, a set of question categories associated with the session, and a set of talking points to be addressed by the live host which are associated with the session.

The session-summary-wagering query selects information related to player wagering in a current game session. The wagering summary includes information such as the average wager per player, the percentage of successful wagers, and the average numbers of tokens won and the average number of tokes lost in wagers.

The session-summary-game query selects a set of information to provide a summary of the game state overall including sets of top scoring players grouped by a number of categories including by region, by affiliation, by state and by overall top scoring for the game.

The game-population query selects information related to the number of players currently participating in the game. The query breaks the player population up by geographic region, by state, and by affiliation. The game population query is, in some embodiments broken up into a number of separate queries. For example, the game population may be determined by queries that select only the overall online population, only the online population grouped by state, and only the online population grouped by affiliation.

The question-summary query selects information related to the number of questions that have been answered correct and a percentage of questions answered correctly for a number of logical groupings including by state, by affiliation, by power-up usage, and by user level.

The poll-results query selects information related to poll results and grouped by a number of logical groupings, such as by overall online players, by state, affiliation, and/or by geographic location.

The affiliation-summary query selects affiliation-related information such as the number of players online affiliated with a particular sports team and number of players online of a particular affiliation grouped by state and/or geographic region.

The top-online-users query selects information summarizing the top-online users for a number of categories, including most tokens earned, average session scores, successful wager percentages, affiliation group leaders, geographic group leaders, and by time online.

Additional variations might occur to the reader after reading the above detailed description.

Voice Mail

In some embodiments, the players can record voice mail messages for the game show host by calling a telephone number specified in the live hosted multiplayer online game. The game show host may then listen to and optionally publish the a voicemail message to the plurality of client devices 110 by sending a publish-audio message to game controller 160 that contains a specially formatted URL that identifies the voice mail message to be published. In alternate embodiments, live host console 140 transmits a publish-voice-mail message to game controller 160 that comprises at least a voicemail id that uniquely identifies a voice mail message. In yet other embodiments, a publish-voice-mail message may comprise additional information such as a username identifying a particular player, an affiliation, and a geographic location. This additional information may be used by game controller 160 to identify the individual who left the voice mail message for the game show host on live host console 140.

Clock Synchronization

Game controller 160 maintains a clock used for synchronization and timekeeping within the live hosted multiplayer online gaming system. Game controller 160 periodically generates a clock-synch message which is received by live host console 140. Live host console 140 synchronizes its internal clock to the controller clock of game controller 160.

Pausing a Game and Automatic Override by Game System

A game show host or producer may pause a game from live host console 140. The Live Controller sends a pause message to game controller 160 and game controller 160 halts the event queue until a continue message is received. Game controller 160 may override the pause function due to time constraints. For example, a particular game show is scheduled for a half-hour timeslot, and a user pauses the game once the game has begun. If game controller 160 determines insufficient time remains in the half-hour to complete all of the remaining scheduled questions in the game if game play is interrupted, game controller 160 will ignore the pause request and continue game play. Similarly, in some embodiments, game controller 160 may resume a paused game if the remaining scheduled time for the game would be insufficient to complete all of the remaining scheduled questions in the game if game play were not resumed.

Registering a Client Device with the Game System

Figure 6:
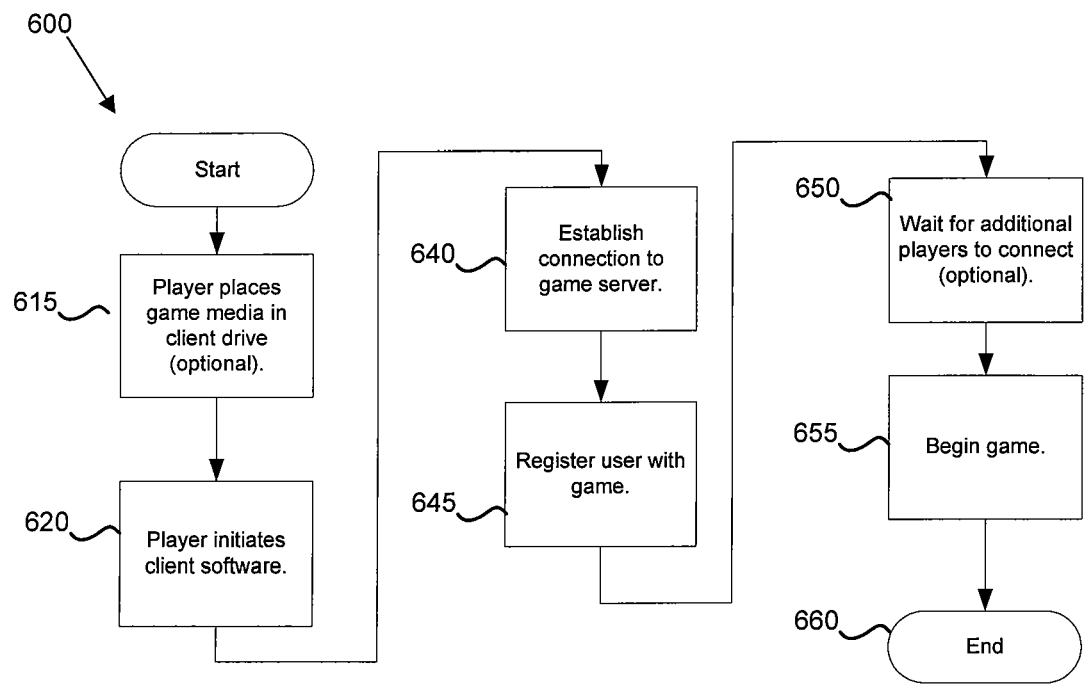
FIG. 6 depicts a flow diagram of a process for connecting a video game client to a live hosted online multiplayer game.

In order for client device 110 to be able to participate in a live hosted multiplayer online game, client device 110 initializes software corresponding to a game client on the client device and then registers with game server 130 in order to participate in the live hosted multiplayer online game. FIG. 6 depicts a flow diagram of a process for connecting client device 110 to a live hosted online multiplayer game according to one embodiment of the present invention. Process 600 starts with step 615 where the user optionally places game media in a media reader of client device 110. In some embodiments, the client program code is not located in a removable media and may be resident in a persistent memory of client device 110. In yet other embodiments, the client program code may be downloaded from game server 130. In step 620, the user initializes the client software on client device 110. The client device then establishes a connection to game server 130 in step 640. In step 645, the user is registered with the live hosted multiplayer online game 645. In some embodiments, the user may have to wait for the game to begin while other users connect (step 655). In step 655, the live hosted multiplayer online game begins. The registration process (step 600) then ends at step 660.

Live Player Feedback

A live player feedback mechanism is provided in some embodiments of the present invention. The live player feedback mechanism allows players to provide feedback regarding game content, such as whether players found game content to be humorous or interesting. In some embodiments, live player feedback also allows players to make suggestions regarding game content, such as potential trivia questions, particular themes for future games, guests of interest that players would like to see host and/or participate in a game show, or news topics of interest that players would like included in game show content.

In some embodiments, players provide feedback via the plurality of client devices 110 and the player feedback is received by game server 130 and/or game controller 160. In other embodiments, players may submit feedback in text format such as via email through the plurality of client devices 110 and/or via alternate communications methods such as email from a personal computer or other networked consumer electronic device and/or text messages from a mobile phone or other communications device. In yet other embodiments, players may submit audio and/or video feedback which may be captured by a microphone and/or camera coupled to the plurality of video game clients 110.

In some embodiments, a game show host may view player feedback via a user interface of live host console 140. Player may feedback may be viewed by a game show host during the course of a live-hosted game, or may, in other embodiments be archived and viewed at a later time. In yet other embodiments, player feedback may also be viewed via a user interface of offline administration console 180.

Ghost Players

Ghost players are provided in some embodiments of the present invention. Ghost players allow a single player to appear in a plurality of virtual game rooms found within the game system. Virtual game rooms allow for a subset of the plurality of players of an online multiplayer game system to participate in a game independently from the remainder of the plurality of players. Virtual game rooms may, for example, be used to limit the number of players in a particular live-hosted multiplayer online game. Virtual game rooms may also be used to allow multiple live-hosted multiplayer online games with different content to be played at the same time. For example, two trivia challenge game shows may be scheduled for the same time. However, a first trivia challenge game show may comprise sports-related trivia content, while a second trivia challenge game show comprises geography-related trivia content.

Players ordinarily would be assigned to a single virtual game room. In some embodiments, a player may be assigned to a virtual game room based upon which game the player selects. In other embodiments, players may also automatically be assigned to virtual game rooms by the game system (game server 130 in some embodiments and game controller 160 in other embodiments) in order to limit the number of players in a particular game (once a first instance of a game in a first virtual game room fills up, the system would create a second instance in a second virtual game room).

Ghost players, however, may appear in a plurality of virtual game rooms. Ghost players may, in some embodiments, be an in-studio special guest, such as a celebrity or sports star, that participates in hosting a plurality of live-hosted online multiplayer games. In some embodiments, live host console 140 provides an interface for controlling ghost players, while in other embodiments a separate user interface is provided for controlling ghost players. Ghost players may monitor the progress of a game in one or more virtual game rooms and provide feedback to the players assigned to those virtual rooms. For example, a ghost player may provide feedback to players in a virtual game room in the form of text messages, ticker messages, images, audio and/or video content. The feedback provided by a ghost player may be displayed on all client devices 110 associated with a particular live-hosted multiplayer game, or may be displayed on only those client devices associated with a selected subset of client devices 110 associated with one or more virtual game rooms. Thus, ghost players advantageously create the appearance that in-studio guests are interacting with players in the more intimate setting of a virtual game room, while allowing the in-studio guests to interact with as large a number of players as possible.

Interactive Karaoke

In some embodiments of the present invention, the game show host may coordinate an interactive karaoke experience from live host console 140. The interactive karaoke experience allows players to participate by singing songs, acting as judges and/or acting as audience members. Audience members listen to and/or view other players singing songs. Audio and/or video content is transmitted by game controller 160 and/or game server 130 to each player's video game client 110. Furthermore, client device 110 may transmit audio and/or video content from players selected to sing a song, players selected as judges, or players participating as audience members. In some embodiments, song lyrics and/or additional audio or video content, such as background music, may also be broadcast to each player's video game client 110.

In some embodiments, a game show host publishes an invitation to join an interactive karaoke experience from live host console 140 to the plurality of client devices 110 and video game clients may join the interactive karaoke experience by sending a request to join to game controller 160 and/or game server 130. In other embodiments, the karaoke experience is a scheduled event and the plurality of video game clients 110 may join the scheduled event by sending a request to join to game controller 160 and/or game server 130.

In an embodiment, players send a request to sing a song from their video game clients 110. The requests are received by game server 130 and forwarded to game controller 160. Game controller 160 forwards the requests to sing to live host controller 140 so that the game show host may view the list of requests to sing. In some embodiments, a game show host selects a next player to sing a song from the live host controller. In other embodiments, requests to sing a song are placed in a request queue and a player that has placed a request to sing is provided the opportunity to sing a song once the player's request reaches the front of the request queue.

Celebrity Stock Market Simulation

In some embodiments of the present invention, a celebrity stock market simulation is provided. The simulation allows players to buy and/or sell "stock" associated with a set of celebrities. Players may buy and/or sell shares of stock for tokens and/or points and/or other game currency. An initial per-share value of the shares of stock associated with a particular celebrity may initially be set by a game show production team. However, the per-share value of the stock for each celebrity may then change over time based upon a number predetermined factors. For example, the per-share value of a stock for a particular celebrity may vary, for example, on a daily basis. Fluctuations in the per-share value of a celebrity's stock may, for example, be determined by tallying the number of times that the celebrity appears in publications in a set of one or more specified news outlets. In some embodiments, negative news treatment may decrease the per-share value of the stock, while positive news treatment may increase the per-share value of the stock. The tallying of the number of times that a celebrity appears in publications may be automated in some embodiments, for example, as a set of executable scripts and/or software programs. In alternative embodiments, a game show producer may manually adjust a celebrity's per-share value via a user interface of offline administration console 180 and/or via live host console 140. Furthermore, in yet other embodiments, the per-share value of a stock may also be affected by the number of trades of a particular stock within a period of time. For example, if a large number of players sell a particular stock during a predetermined period of time, the value of the stock may decrease accordingly.

Players may buy and/or sell shares of stock to other players in some embodiments and/or in to a central bank in yet other embodiments. A player selling stock would receive a credit for the current per-share value of the stock multiplied by the number of shares being sold. The per-share value may be represented as a number of points, a number of tokens and/or other game currency. Players purchasing shares of stock would be debited the per-share value of the stock multiplied by the number of shares to be purchased.

Live Fantasy Sports Games

In some embodiments of the present invention, live fantasy sports games are provided. A live fantasy sports game allows players to compete against one another by building sports teams, such as football or basketball teams, that compete against one another. Players may select real-world sports players in order to construct a fantasy sports team. In some embodiments, players compete against one another in a draft where players take turns drafting individual real-world players onto their fantasy sports teams. Furthermore, in some embodiments, players may be traded from one team to another during the course of a game.

The performance of a fantasy sports team may, for example, be determined by accumulating player statistics for the real-world sports players included in the fantasy sports team. A number of points may be awarded to a fantasy sports team based upon the performance of the individual players associated with the team. The better the performance of the real-world players associated with a fantasy sports team, the more points that the team will be awarded.

Winners of the fantasy sports game may be determined by overall team performance over a predetermined period of time. For example, a fantasy football game may be active for the length of the National Football League season, and those players whose fantasy teams that have the highest number of points at the end of the season will be the winners. Winners may be awarded tokens, points, and/or pieces of flair such a badges or trophies. Furthermore, top performing teams for predefined time periods, such as a day, week, or month may also be awarded prizes such as tokens, points, and/or pieces of flair such a badge or trophies.

In some embodiments, a game show host may interactively discuss picks that the game show host believes may be top performers for the week and/or day, etc. Players may also interact with the game show host to provide feedback regarding the game show host's picks for the week and/or day, etc., as described above in the Live Player Feedback section. As described above, players may interact with the game show host through in various ways such as text messages, emails, and audio and/or video commentary. Also, in some embodiments, a game show host may also publish player polls and/or conduct raffles during a fantasy sports game session.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A live-hosted multiplayer online gaming system comprising:
    a plurality of game clients;
    a network that provides for data communication to and from game clients;
    a game controller, coupled to the network, comprising:
        logic to operate a live hosted multiplayer online game;
        logic to couple the game controller to at least some of the plurality of game clients via the network; and
        logic to receive inputs from and to send outputs to the at least some of the plurality of game clients; and
    a live operator console comprising:
        logic to couple live operator input to the game server to enable communication between the live operator input and the game controller;
        logic to synchronize the live operator input to a current game state maintained by the game controller, wherein the logic to synchronize the live operator input further comprises logic to receive audiovisual content generated by a live game host and to provide the audiovisual content to the game controller to be forwarded to the plurality of game clients, the audiovisual content provided by the live operator being synchronized with the current game state, wherein the audiovisual content provided by the live host includes live commentary from the live host regarding in-game events; and
        logic to send messages to the game controller that cause the game controller to create events that control at least in part the execution of the live hosted multiplayer online game.

2. The multiplayer networked gaming system of claim 1, wherein a first portion of the plurality of game clients are actively participating in the online multiplayer game and a second portion of the game clients are spectators viewing the online multiplayer game.

3. The multiplayer networked gaming system of claim 1, wherein the multiplayer online game is a game show format, a user of the live operator input acts as the host of the game show and users of some of the plurality of game clients are game show contestants and the users of a remainder of the plurality of the game show clients comprise a game show audience.

4. The multiplayer networked gaming system of claim 1, further comprising:
    an offline administration console including logic for entering and maintaining a set of content to be utilized in the execution of the live-hosted multiplayer online game;
    and logic to couple the offline administration console to the game controller to enable the game controller to access and utilize the set of content while operating the live-hosted multiplayer online game.

5. The multiplayer networked gaming system of claim 1, wherein a message sent by the live operator input to the game controller comprises a request that the game controller publish content to the plurality of video game clients.

6. The multiplayer networked gaming system of claim 5, wherein the content comprises an image to be displayed on a user interface of each of the plurality of the video game clients.

7. The multiplayer networked gaming system of claim 5, wherein the content comprises a text message to be displayed on a user interface of each of the plurality of the video game clients.

8. The multiplayer networked gaming system of claim 5, wherein the content comprises a poll to be displayed on a user interface of each of the plurality of the video game clients; and
    wherein the game controller further comprises:
        logic to receive a set of poll responses from the plurality of video game clients;
        logic to create a summary of the set of poll responses from the plurality of the video game clients; and
        logic to transmit the summary of the set of poll responses to the live host console.

9. The multiplayer networked gaming system of claim 5, wherein the content comprises a ticker message to be displayed on a ticker portion of a user interface of each of the plurality of the video game clients.

10. The multiplayer networked gaming system of claim 1, wherein the live host console further comprises:
    logic to receive the summary of the set of poll responses and to display the summary of the set of poll responses on a user interface of the live host console.

11. The multiplayer networked gaming system of claim 1, wherein the game controller further comprises:
    logic to publish a raffle to the plurality of client devices;
    logic to send a raffle details message to the live host console comprising a description of a raffle;
    logic to receive a first set of raffle responses from the plurality of video game clients;
    logic to determine a first set of raffle winners from the first set of raffle responses received from the plurality of video game clients; and
    logic to send the first set of raffle winners to the live host console.

12. The multiplayer networked gaming system of claim 11, wherein the live host console further comprises:
    logic to receive the first set of raffle winners and to display the first set of raffle winners on a user interface of the live host console.

13. The multiplayer networked gaming system of claim 12, wherein the live host console further comprises:
    logic to send a live host publish raffle results request to the game controller, wherein the publish raffle results request comprises a publish-raffle-results message including a set of raffle results to be displayed on a user interface of the plurality of client devices; and wherein the game controller further comprises:
logic to send a show-raffle-results message to the plurality of video game clients in response to the publish raffle results request, wherein the show-raffle-results message instructs the plurality of video game clients to display in a user interface the set of raffle results from the publish-raffle-results message.

14. The multiplayer networked gaming system of claim 11, wherein the live host console further comprises:
logic to display the first set of raffle responses received from the plurality of video game clients;
logic to receive a first set of raffle winners selected from the first set of raffle responses received from the plurality of video game clients;
logic to instruct the game controller to publish the first set of raffle winners.

15. The multiplayer networked gaming system of claim 14, wherein the logic to instruct the game controller to publish the first set of raffle winners further comprises:
logic to receive an audiovisual data stream announcing the winners of the raffle; and
logic to send the audiovisual data stream to the game controller to be displayed by the plurality of client devices.

16. The multiplayer networked gaming system of claim 1, wherein the game controller comprises:
logic to transmit a question to be displayed on a user interface of the plurality of a video game clients;
logic to receive a set of responses from the plurality of video game clients;
logic to create a summary of the set of responses; and
logic to transmit the summary of the set of responses to the live host console.

17. The multiplayer networked gaming system of claim 16, wherein the live host console comprises logic to receive the summary of the set of responses and to display the summary of the set of responses on a user interface of the live host console.

18. The multiplayer networked gaming system of claim 1, wherein the game controller comprises:
logic to publish a celebrity stock market simulation, the logic comprising:
logic to receive from the plurality of client devices a set of requests to purchase shares of stock associated with a celebrity;
logic to receive from the plurality of client devices a set of requests to sell shares of stock associated with the celebrity;
logic to determine a per-share value for the shares of stock for the celebrity;
logic to sell shares of stock to the plurality of client devices in response to receiving a set of requests to purchase shares of stock associated with a celebrity; and
logic to buy shares of stock from the plurality of client devices in response to receiving a set of requests to sell shares of stock associated with a celebrity.

19. The multiplayer networked gaming system of claim 18, wherein the per-share value for shares of stock for the celebrity is determined from a number of times that the celebrity is mentioned in a set of key news outlets;
wherein the per-share value for the shares of stock for the celebrity decreases if the set of key news outlets mentions the celebrity less than a minimum threshold number of times within a specified time period; and
wherein the per-share value for the shares of stock for the celebrity increases if the set of key news outlets mentions the celebrity more than a maximum threshold number of times within the specified time period.

20. The multiplayer networked gaming system of claim 1, wherein the game controller comprises:
logic to receive a set of one or more live evaluations from the plurality of video game clients, wherein the live evaluations include feedback regarding the content of the live hosted multiplayer online game; and
logic to display the set of one or more live evaluations from the plurality of video game clients on the live host console.

21. The multiplayer networked gaming system of claim 1, wherein the game controller comprises:
logic to publish an invitation to join karaoke event to the plurality of video game clients;
logic to receive a request to join the karaoke event from a subset of the plurality video game clients in response to the invitation;
logic to receive a set of one or more requests to sing a song from the subset of video game clients who responded to the invitation;
logic to select a video game client associated with the one or more requests to sing a song;
logic to receive audio content from the selected video game client; and
logic to broadcast the audio content to the subset of video game clients.

22. The multiplayer networked gaming system of claim 21, wherein a first portion of the subset of video game clients who responded to the invitation participate in the karaoke event as judges and a second portion of the subset of video game clients participate in the karaoke event as an audience.

23. The multiplayer networked gaming system of claim 21, wherein the live host console further comprises:
logic to select a video game client associated with the one or more requests to sing a song.

24. The multiplayer networked gaming system of claim 1, wherein the game controller comprises:
logic to publish a fantasy sports game to the plurality of video game clients;
logic to receive a set of request to join the fantasy sports game from a subset of the plurality of video game clients;
logic to enroll the subset of the plurality of video game clients in the fantasy sports game that requested to join the fantasy sports game;
logic to receiving a set of player selections from each of the subset of the plurality of video game clients;
logic to determine a set of fantasy sports teams based upon the set of player selections received from the enrolled video game clients;
logic to determine performance statistics of each of the set of fantasy sports teams from statistics of real-world sports players; and
logic to publish the performance statistics of each of the set of fantasy sports teams to the subset of the plurality of video game clients.

25. A method for operating a live hosted multiplayer online game comprising:
registering a plurality of video game clients to participate in the live hosted multiplayer online game;
registering a live host console to provide a user interface for a live host to control and monitor the live hosted multiplayer online game;
publishing content to the plurality of video game clients, wherein publishing the content to the plurality of video game clients includes publishing a question to the plurality of video game clients and publishing audiovisual content generated by a live game host, the audiovisual content provided by the live operator being synchronized with the current game state, wherein the audiovisual content provided by the live host includes live commentary from the live host regarding in-game events;

receiving a set of responses from the plurality of video game clients;

creating a summary of the set of responses received from the plurality of video game clients;

sending the summary of the set of responses to the live host console;

receiving an event request from the live host console; and transmitting a game content to the plurality of client video game clients in response to the event request.

26. The method of claim 25, wherein the event received in the step of receiving an event from the live host console is a publish-text request comprising a text message to be displayed on a user interface of the plurality of video game clients; and wherein the game content transmitted in the step of transmitting a game content to the plurality of video game clients comprises a show-text message instructing the plurality of video game clients to display the text message identified in the publish-text request.

27. The method of claim 25, wherein the event received in the step of receiving an event from the live host console is a publish-video request comprising an identifier of a video content to be displayed on a user interface of the plurality of video game clients; and wherein the game content transmitted in the step of transmitting a game content to the plurality of video game clients comprises a show-video message instructing the plurality of video game clients to display the video content identified in the publish-text request; and wherein the step of transmitting a game content to the plurality of video game clients further comprises:

streaming the video content identified in the publish-video request to the plurality of the game clients.

28. The method of claim 25, wherein the event received in the step of receiving an event from the live host console is a publish-image request comprising an identifier of a image to be displayed on a user interface of the plurality of video game clients; and wherein the step of transmitting a game content to the plurality of video game clients comprises a show-image message instructing the plurality of video game clients to display the image identified in the publish-image request; and wherein the step of transmitting a game content to the plurality of video game clients further comprises:

communicating the image file identified in the publish-image request to the plurality of game clients.

29. The method of claim 25, wherein the event received in the step of receiving an event from the live host console is a publish-audio request comprising an identifier of an audio file to be played on of the plurality of video game clients; and wherein the game content transmitted in the step of transmitting a game content to the plurality of video game clients comprises a play-audio message instructing the plurality of video game clients to play the audio content identified in the publish-audio request; and wherein the step of transmitting a game content to the plurality of video game clients further comprises:

streaming the audio content identified in the publish-audio request to the plurality of the game clients.

30. The method of claim 25, wherein the event received in the step of receiving an event from the live host console is a publish-ticker request comprising a message to be displayed on a ticker portion of a user interface of the plurality of video game clients; and wherein the game content transmitted in the step of transmitting a game content to the plurality of video game clients comprises a ticker message instructing the plurality of video game clients to display the message identified in the publish-ticker request.

31. The method of claim 25, wherein the event received in the step of receiving an event from the live host console is a publish-poll request comprising a poll to be displayed on a user interface of the plurality of video game clients; and wherein the game content transmitted in the step of transmitting a game content to the plurality of video game clients comprises a show-poll message instructing the plurality of video game clients to display the poll identified in the publish-ticker request.

32. The method of claim 31, further comprising:

receiving a set of poll responses from the plurality of video game clients;

creating a summary of the set of poll responses received from the plurality of video game clients;

sending the summary of the set of poll responses to the live host console;

receiving an publish poll results request from the live host console; wherein the publish poll results request comprises a publish-poll-results-message comprising a set of poll results to be displayed; and transmitting a show-poll-results message to the plurality of client video game clients in response to the event request, wherein the show-poll-results message instructs the plurality of video game clients to display the set of poll results from the publish-poll-results message.

33. The method of claim 25, wherein the event received in the step of receiving an event from the live host console is a publish-game-leaders request comprising a list of top players be displayed on a user interface of the plurality of video game clients; and wherein the game content transmitted in the step of transmitting a game content to the plurality of video game clients comprises a show-game-leaders message instructing the plurality of video game clients to display the list of top players identified in the publish-game-leaders request.

34. The method of claim 25, wherein the request received in the step of receiving an event request from the live host console is a scheduled request; and wherein the step of transmitting a game content to the plurality of client video game clients in response to the event request is not performed until a time specified in the event request.

35. The method of claim 25, further comprising:

publishing a raffle to the plurality of video game clients;

sending a raffle details message to the live host console comprising a description of the raffle published to a plurality of video game clients;

receiving a first set of raffle responses from the plurality of video game clients;

determining a first set of raffle winners from the first set of raffle responses received from the plurality of video game clients; and sending the first set of the raffle winners to the live host console.

36. The method of claim 35, further comprising:
receiving a publish raffle results request from the live host console, wherein the publish raffle results request comprises a publish-raffle-results message comprising a set of raffle results to be displayed on a user interface of the plurality of client devices; and
transmitting a show-raffle-results message to the plurality of video game clients in response to the publish raffle results, wherein the show-raffle-results message instructs the plurality of video game clients to display the set of raffle results from the publish-raffle-results message.

37. The method of claim 35, wherein the live host console further comprises:
logic to display the first set of raffle responses received from the plurality of video game clients;
logic to receive a first set of raffle winners selected from the first set of raffle responses received from the plurality of video game clients;
logic to instruct the game controller to publish the first set of raffle winners.

38. The method of claim 37, wherein the logic to instruct the game controller to publish the first set of raffle winners further comprises:
logic to receive an audiovisual data stream announcing the winners of the; and
logic to send the audiovisual data stream to the game controller to be displayed by the plurality of client devices.

39. The method of claim 25, further comprising:
publishing a celebrity stock market simulation, the step of publishing the stock market simulation comprising:
receiving from the plurality of client devices a set of requests to purchase shares of stock associated with a celebrity;
receiving from the plurality of client devices a set of requests to sell shares of stock associated with the celebrity;
determining a per-share value for the shares of stock for the celebrity;
selling shares of stock to the plurality of client devices in response to receiving the set of requests to purchase shares of stock associated with a celebrity; and
buying shares of stock from the plurality of client devices in response to receiving the set of requests to sell shares of stock associated with a celebrity.

40. The method of claim 25, wherein the per-share value for shares of stock for the celebrity is determined from a number of times that the celebrity is mentioned in a set of key news outlets;
wherein the per-share value for the shares of stock for the celebrity decreases if the set of key news outlets mentions the celebrity less than a minimum threshold number of times within a specified time period; and
wherein the per-share value for the shares of stock for the celebrity increases if the set of key news outlets mentions the celebrity more than a maximum threshold number of times within the specified time period.

41. The method of claim 25, further comprising:
receiving a set of one or more live evaluations from the plurality of video game clients, wherein the live evaluations include feedback regarding the content of the live hosted multiplayer online game; and
displaying the set of one or more live evaluations from the plurality of video game clients on the live host console.

42. The method of claim 25, further comprising:
publishing an invitation to join karaoke event to the plurality of video game clients;
receiving a request to join the karaoke event from a subset of the plurality video game clients in response to the invitation;
receiving a set of one or more requests to sing a song from the subset of video game clients who responded to the invitation;
selecting a video game client associated with the one or more requests to sing a song;
receiving audio content from the selected video game client; and
broadcasting the audio content to the subset of video game clients.

43. The method of claim 42, wherein a first portion of the subset of video game clients participate in the karaoke event as judges and a second portion of the subset of video game clients participate in the karaoke event as an audience.

44. The method of claim 42, wherein the selecting a video game client associated with the one or more requests to sing a song is selected from the live-host console.

45. The method of claim 25, further comprising:
publishing a fantasy sports game to the plurality of video game clients;
receiving a set of request to join the fantasy sports game from a subset of the plurality of video game clients;
enrolling the subset of the plurality of video game clients in the fantasy sports game in response to receiving the set of requests to join the fantasy sports game;
receiving a set of player selections from each of the subset of the plurality of video game clients after enrolling the subset of the plurality of video game clients;
determining a set of fantasy sports teams based upon the set of player selections received from the enrolled video game clients after receiving the set of player selections;
determining performance statistics of each of the set of fantasy sports teams from statistics of real-world sports players; and
publishing the performance statistics of each of the set of fantasy sports teams to the subset of the plurality of video game clients.

* * * * *